Figure 1:
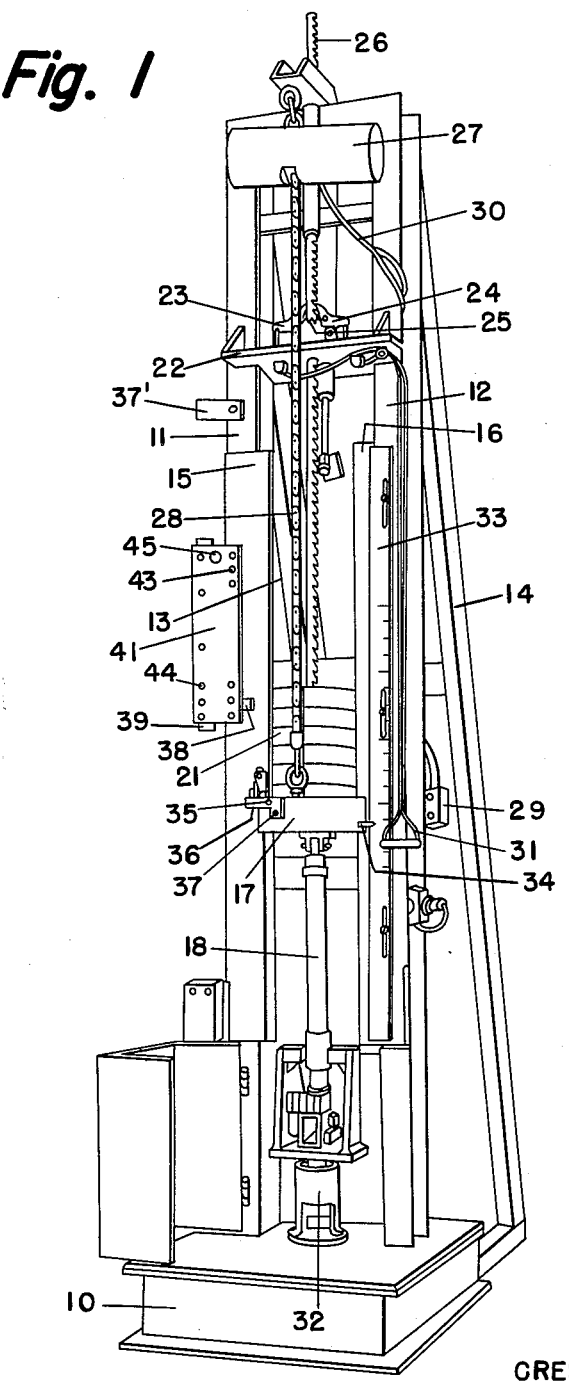

May 21, 1963    C. F. LAAGER ET AL    3,090,228
TESTING OF CARTRIDGE ACTUATED DEVICES
Filed Aug. 2, 1961    4 Sheets-Sheet 1

INVENTORS
CRESTON F. LAAGER
EMIL A. MATHIAS
BY
S.J. Rotondi, A.J. Dupont y S. Dubroff
ATTORNEYS May 21, 1963  C. F. LAAGER ET AL  3,090,228
TESTING OF CARTRIDGE ACTUATED DEVICES
Filed Aug. 2, 1961  4 Sheets-Sheet 2

INVENTORS
CRESTON F. LAAGER
EMIL A. MATHIAS
BY
S.J. Rotondi, A.J. Dupont & S. Dubroff
ATTORNEYS INVENTORS
CRESTON F. LAAGER
EMIL A. MATHIAS
BY S.J. Rotondi, A.J. Dupont & S. Dubroff
ATTORNEYS

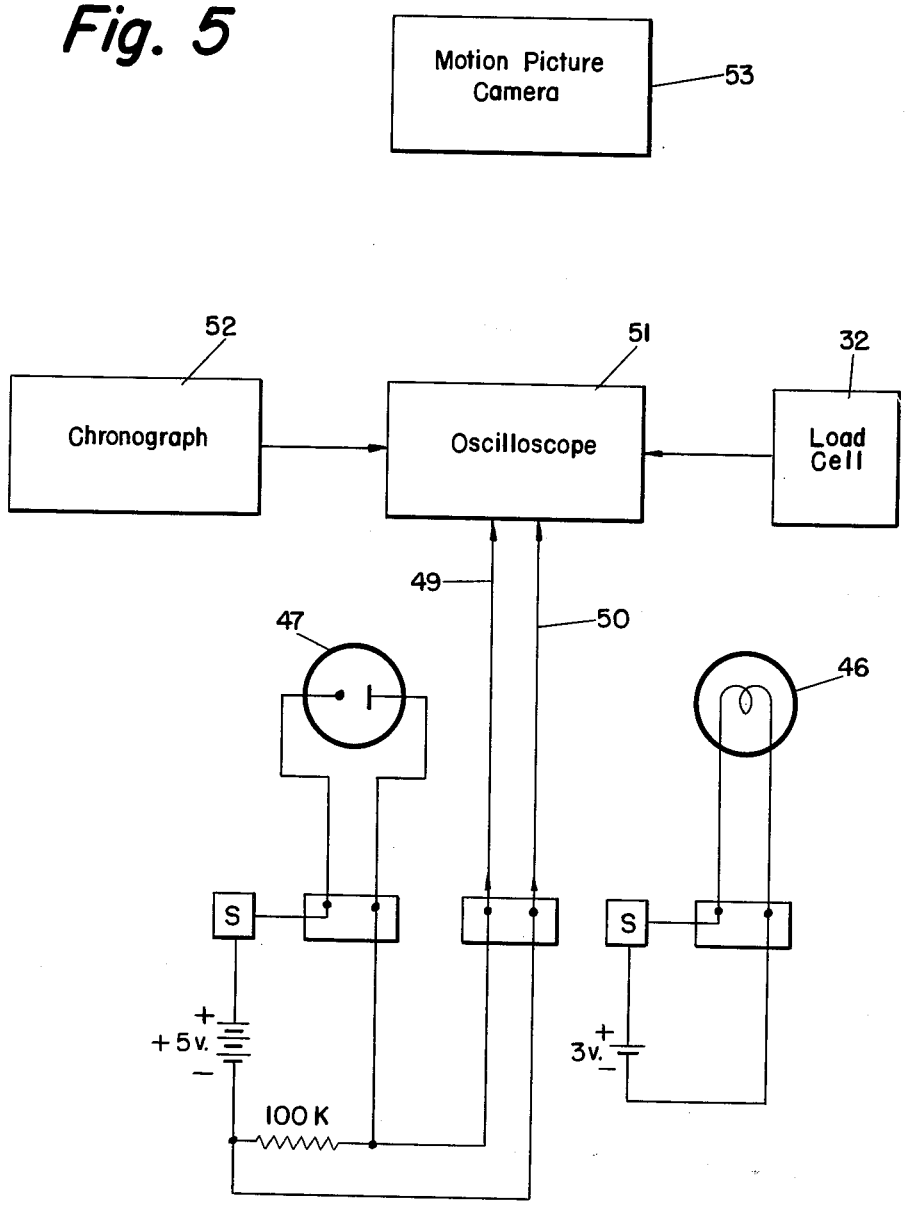

United States Patent Office
3,090,228
Patented May 21, 1963

3,090,228
TESTING OF CARTRIDGE ACTUATED DEVICES
Creston F. Laager, Beverly, N.J., and Emil A. Mathias, Cheltenham, Pa., assignors to the United States of America as represented by the Secretary of the Army
Filed Aug. 2, 1961, Ser. No. 128,903
1 Claim. (Cl. 73—167)
(Granted under Title 35, U.S. Code (1952), sec. 266)

The invention described herein may be manufactured and used by or for the Government for governmental purposes without the payment to us of any royalty thereon.

This invention relates to the testing of cartridge actuated devices. Its purpose is to provide an improved mechanism which (1) closely simulates the conditions under which the cartridge actuated device is to be operated and (2) functions to make available data indicative of its performance in actual use.

Cartridge actuated devices are commonly used in aircraft escape systems as canopy removers or to operate other types of load devices. In connection with such uses it is desirable to know the magnitude of the force exerted on the load device, the distance the load device travels, and the velocity at which the load device moves during a part or all of its travel. The mechanism of the present invention is readily operable to provide all these data. Briefly stated, it functions to provide (1) a measure of the travel of the load device, (2) a record of the force applied to the load device, and (3) a record of the distance over which the load device travels during a predetermined time interval. From the latter record, the velocity of the load device is readily obtained.

The invention will be better understood from the following description when considered in connection with the accompanying drawings and its scope is indicated by the appended claim.

Figure 2:
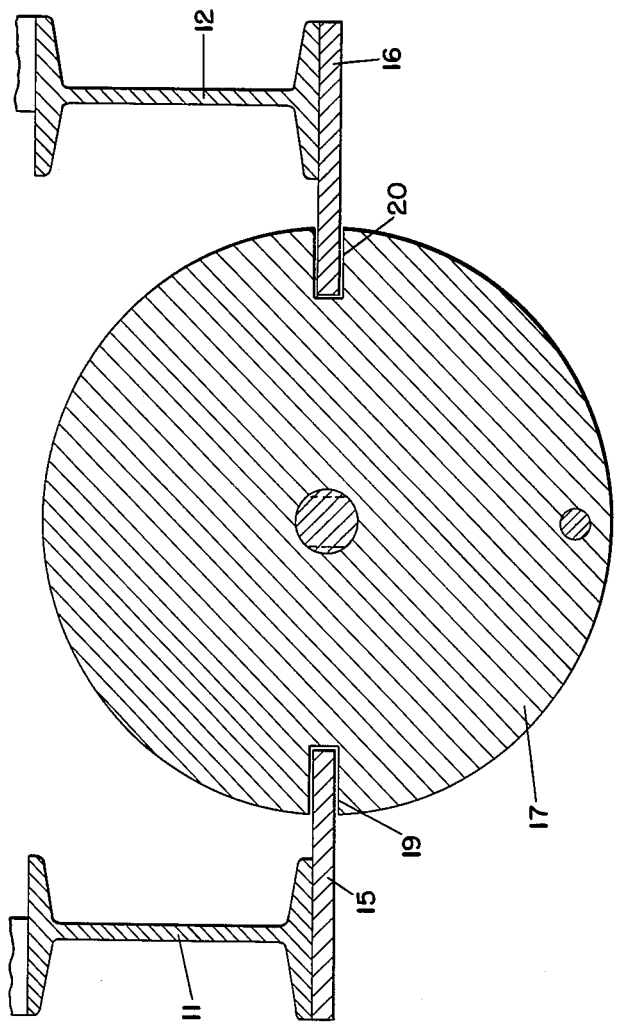
Figure 6:
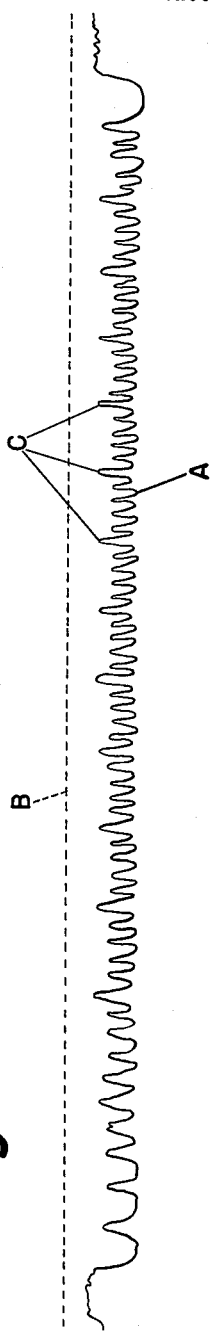
Figure 4:
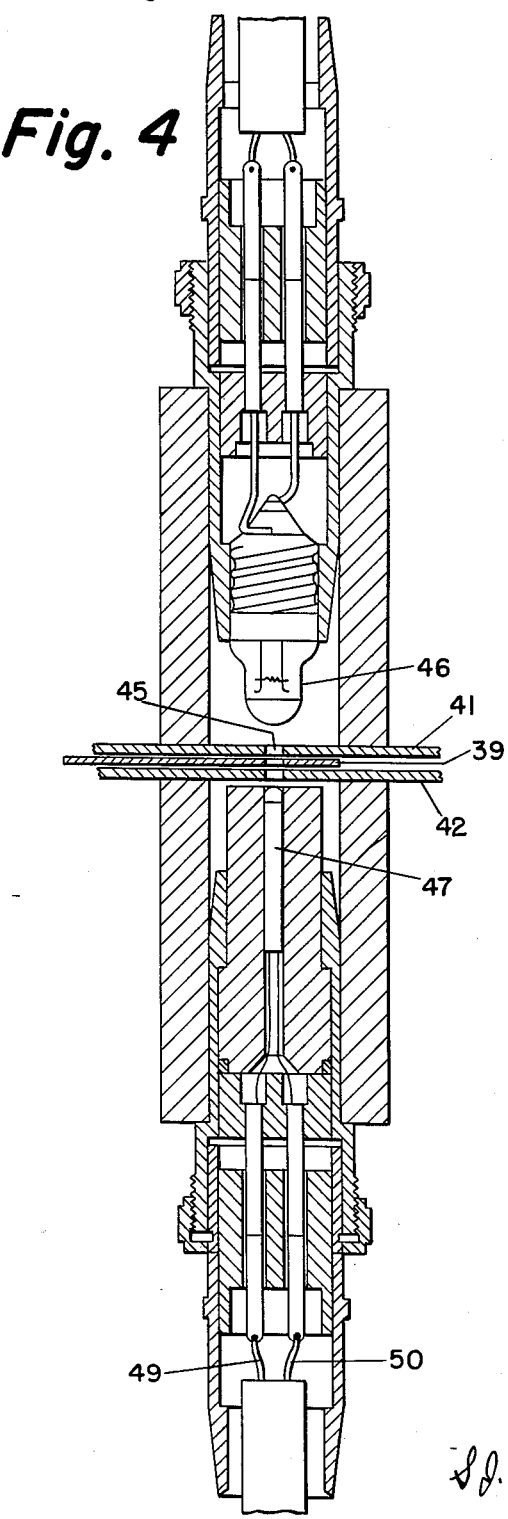
Figure 3:
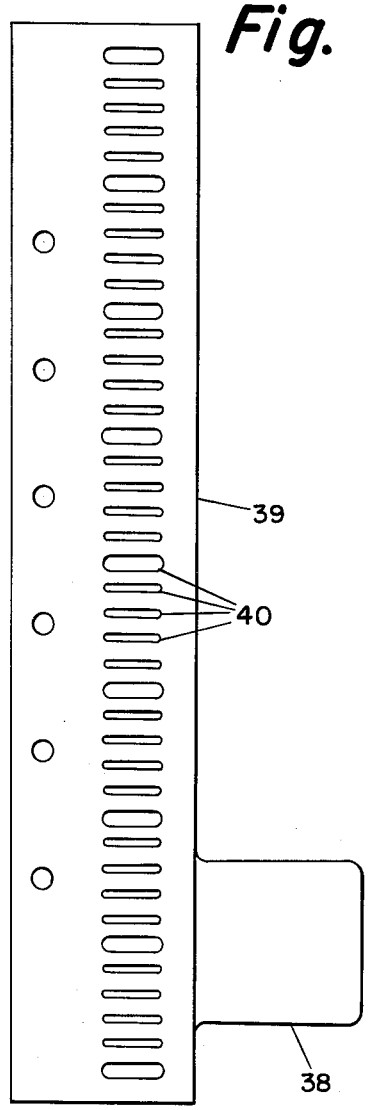

Referring to the drawings:

FIG. 1 is a perspective view of the cartridge actuated device testing mechanism, FIG. 2 is a showing of the relation between a carriage and its guide rails, FIG. 3 depicts the details of a signal plate which functions to modulate a light beam in accordance with the speed of the carriage, FIGS. 4 and 5 illustrate certain details of the velocity measuring elements of the mechanism, and FIG. 6 shows the record produced by these elements.

The cartridge actuated device testing mechanism of FIG. 1 includes a base 10 upon which is mounted a support consisting of I-beams 11 and 12 and braces 13 and 14. Fixed to the I-beams 11 and 12 is a track having rails 15 and 16 along which a carriage 17 is moved upon the firing of a cartridge actuated device 18. As shown more clearly in FIG. 2, the rails 15 and 16 extend into guideways 19 and 20 at the opposite sides of the carriage 17.

The carriage 17 supports a plurality of weight increments 21 which are bolted to the carriage and are commensurate with the weight of the load to be moved by the tested device 18. Fixed between the I-beams 11 and 12 is a guide member 22 to which are pivoted a pair of jaws 23 and 24. These jaws are biased by a spring 25 into engagement with a rod 26 which is fixed to the carriage 17 and is notched at its opposite sides to receive the points of the jaws and support the carriage 17 at the end of its travel. The carriage 17 is lowered from this position by an electric crane 27 to which it is attachable by a chain 28. Before the carriage is lowered, the jaws 23 and 24 are disengaged from the rod 26 by means of a carriage release control member 31 which functions to separate the jaws against the tension of the spring 25. The crane is operated from a control box 29 to which it is connected through leads 30.

The device 18 to be tested is coupled at its upper end to the underside of the carriage 17 and at its lower end to a load cell 32 which may be of the type described and illustrated on page 7 of a "Bulletin 4300" issued by Baldwin-Lima-Hamilton Corporation of Waltham 54, Massachusetts and entitled, "Load, Torque, and Fluid Pressure Measurement and control with SR–4 Devices and Equipment." This load cell functions to provide a voltage which is proportional to the pressure exerted by the device 18. This voltage may be applied to a recorder which draws a curve representative of the force developed by the tested device or to an oscilloscope to provide a trace which is recorded on a motion picture film as hereinafter explained.

A scale 33 is adjustably attached to the rail 16 and cooperates with a pointer 34 on the carriage 17 to measure the travel of the carriage.

Also pivoted to the carriage 17 by a pin 35 is a lever 36 which is maintained in its illustrated position by a shear pin 37. This lever is adapted to engage an extension 38 of a signal plate 39 which, as hereinafter described, functions with certain associated elements to provide a voltage modulated in accordance with a distance traveled by the carriage 17. This distance is terminated by the signal plate engaging a stop 37' and shearing the pin 37.

The form of the signal plate 39 is shown in FIG. 3. It consists of a plate having a plurality of slots 40 which are exactly two inches apart with every fifth slot enlarged to more readily identify the scale. It is movable between a member 41 fixed to the rail 15 and a member which is fixed to and slightly spaced from the member 41. The member 41 is adapted for attachment to the rail 15 at various points as indicated by the perforations 43 and 44. It is illustrated as mounted in its lowermost position. The position to be utilized depends on the length of the tested device.

Near the upper end of the member 42, an opening 45 extends through the members 41 and 42, and at the opposite sides of this opening are mounted a light source 46 and a photoelectric cell 47 as indicated in FIG. 4. With this arrangement, there is produced at the output leads 49 and 50 of the photocell 47 a voltage which is modulated in accordance with a distance over which the carriage 17 and the signal plate 39 are moved.

The output voltage of the photocell 47 is applied to one channel of a multi-channel oscilloscope 51 as indicated by FIG. 5. To a second channel of the oscilloscope 51 is applied from a chronograph 52 a series of pulses which are spaced apart by one millisecond. The two traces appearing on the face of the oscilloscope are photographed by a motion picture camera 53 which produces a record like that of FIG. 6. In this record, the trace A represents the distance modulated output voltage of the photocell and the trace B represents the timing pulses applied by the chronograph 52. Since the travel distance between each of the peaks C is exactly two inches, the time required for the carriage to travel a given distance is readily determined by counting the time dots between the peaks of the trace A. With this information, the velocity and acceleration of the carriage may be computed. As previously indicated, the load 32 may have its output voltage applied to a third channel of the multi-channel oscilloscope 51 to produce a trace (not shown) which represents the force exerted by the tested device.

We claim:

In a device for testing a mechanism having parts movable with respect to one another by the firing of an explosive cartridge, the combination therewith of means supporting a vertical track with a support fixed to its lower end, a load cell mounted on said support and coupled to one of said parts, a carriage movable along said track and coupled to the other of said parts, said carriage bearing weight increments simulating the load to be moved by said mechanism, means for producing transitory traces one of which is representative of a distance traveled by said carriage and the other of which is representative of time, and means for making a permanent record of said traces, the means for producing said transitory trace representative of distance including a light source, a photoelectric cell, a signal plate having accurately spaced apertures and movable by said carriage between said source and said cell, and an oscillograph having a channel modulated by the output of said cell.

References Cited in the file of this patent

UNITED STATES PATENTS

| | | |
|---|---|---|
| 2,467,764 | Martin | Apr. 19, 1949 |
| 2,972,142 | Parkinson et al. | Feb. 14, 1961 |
| 2,998,719 | Rubin | Sept. 5, 1961 |
| 3,019,073 | Hall | Jan. 30, 1962 |

OTHER REFERENCES

An article entitled, "Experiments in Interior Ballistics" by W. H. Tschappat, in Mechanical Engineering, August, 1926, vol. 48, No. 8, pp. 819–825, 73–167. (A copy available in Div. 36.)